March 29, 1949. R. A. ERSKINE 2,465,438
POWER TRANSMISSION
Filed Dec. 21, 1945 2 Sheets-Sheet 1

INVENTOR.
ROBERT A. ERSKINE
BY
Ralph L. Truesdale
ATTORNEY

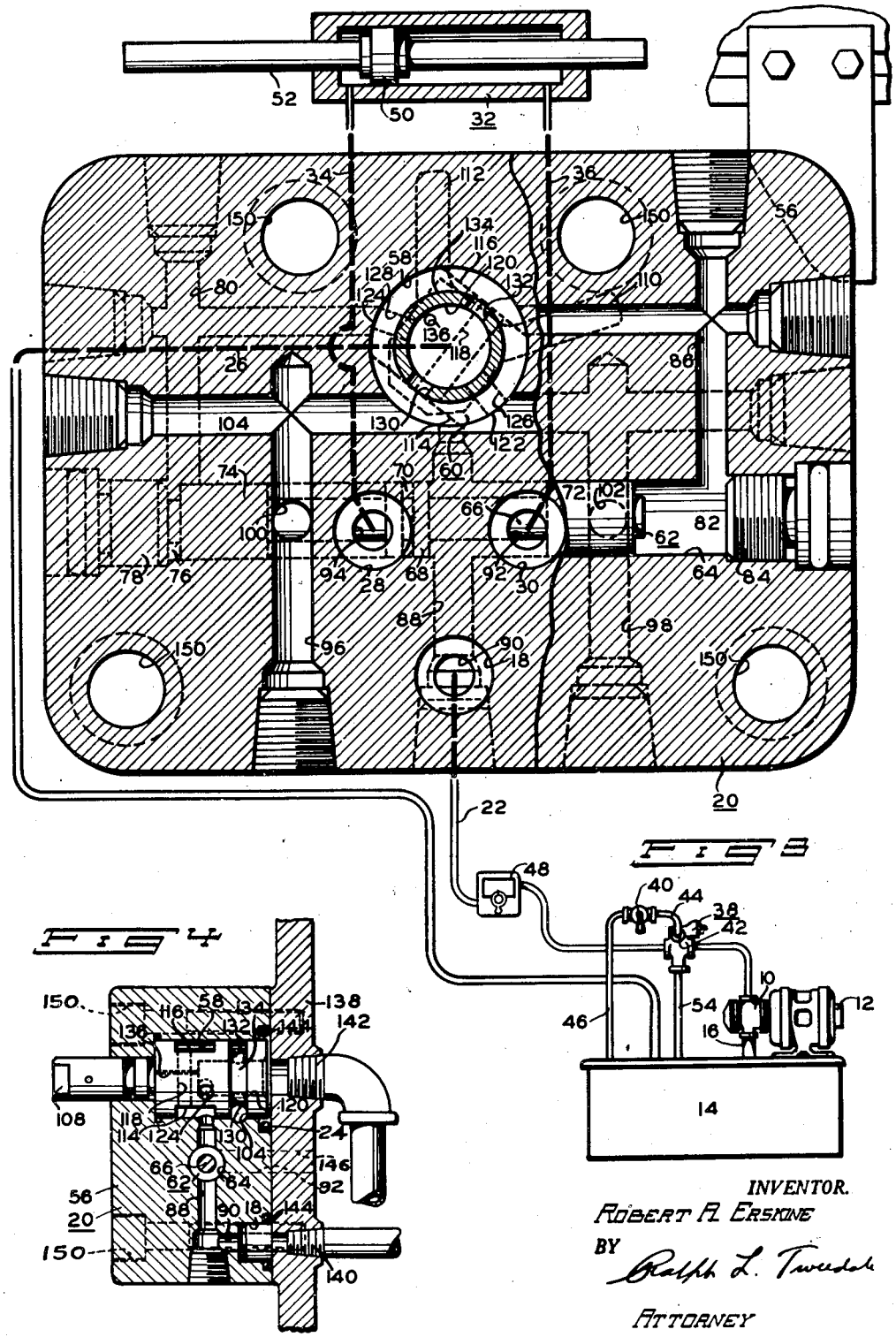

Patented Mar. 29, 1949

2,465,438

UNITED STATES PATENT OFFICE 2,465,438

POWER TRANSMISSION

Robert A. Erskine, Detroit, Mich., assignor to Vickers Incorporated, Detroit, Mich., a corporation of Michigan Application December 21, 1945, Serial No. 636,340

4 Claims. (Cl. 60—52)

This invention relates to power transmissions, particularly to those of the type comprising two or more fluid pressure energy translating devices, one of which may function as a pump and another as a fluid motor.

This invention is more particularly concerned with providing means to be incorporated in a hydraulic transmission for automatically producing a continuous reciprocating movement of a reversible fluid motor. A simple way of producing this reciprocal movement is to incorporate in a panel a fluid pressure operated reversing valve for directing fluid to and from the motor and a pilot valve operated by the motor at each end of the motor stroke for controlling the reversing valve. One defect of the panels designed in the past was cumbersomeness caused by their weight and size. It is a problem to design a panel containing a minimum number of passages and ports connected to the pilot valve and reversing valve. By reducing the number of passages and ports to an absolute minimum, the size of the panel may be greatly reduced in size and weight and, in addition, the manufacture of the same is simplified and the ultimate cost of the panel is reduced.

It is accordingly an object of the present invention to provide an improved unitary control panel containing the necessary control elements for producing a continuous reciprocating operation of a reversible fluid motor which will be light in weight and small in size.

It is also an object of this invention to design the housing of the control panel and a pivot valve contained therein in such a manner that the same bore used for mounting the pilot valve is also used as an external tank port, thereby eliminating a plurality of passages and reducing the size and weight of the panel.

It is also an object of this invention to provide an improved unitary control panel containing the necessary control elements for automatically producing a reciprocatory operation of a reversible fluid motor which is readily adaptable for mounting against a block containing all circuit connections.

Further objects and advantages of the present invention will be apparent from the following description, reference being had to the accompanying drawings wherein a preferred form of the present invention is clearly shown.

In the drawings:

Figure 3 is a diagrammatic view of a hydraulic transmission incorporating a preferred form of the present invention but with the parts in a different position than shown in Figure 1.

Figure 4 is a center sectional view of the device shown in Figures 1 and 3 but with the parts shown in Figure 2 rotated midway between the positions shown in Figures 1 and 3.

Figures 1, 2:
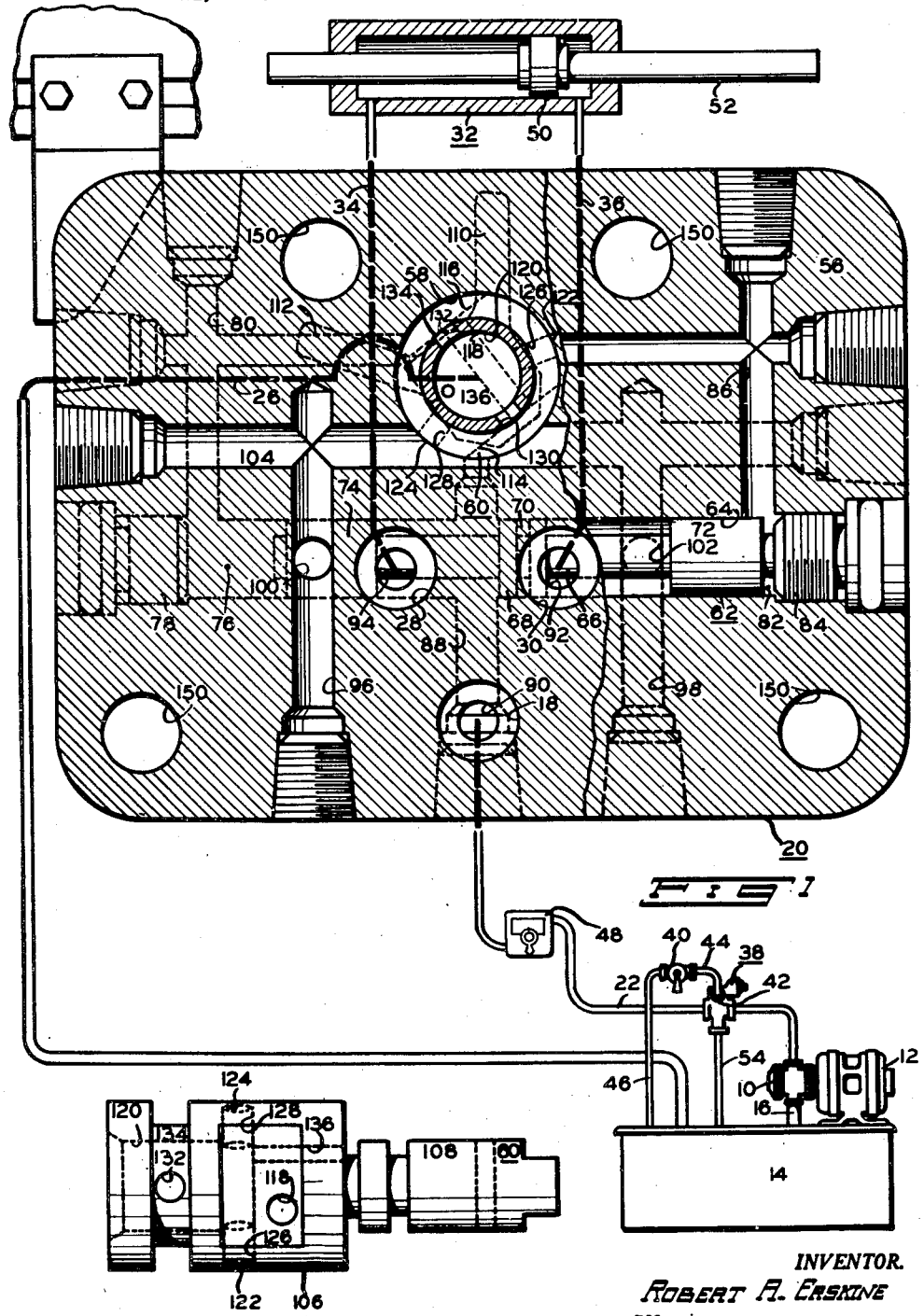
Figure 1 is a diagrammatic view of a hydraulic transmission incorporating a preferred form of the present invention.
Figure 2 is a side view of a portion of the device shown in Figure 1.

Referring now to Figure 1, there is shown a pump 10 which may be driven by an electric motor 12. The pump 10 is connected to a tank 14 by means of a suction conduit 16 and is connected to a pressure port 18 of a unitary control panel 20 by means of a pump delivery conduit 22. Panel 20 also has a tank port 24 (Figure 4) which is connected to tank 14 by means of a conduit 26 and motor ports 28 and 30 which are connected to opposite ends of a reciprocal motor 32 by means of conduits 34 and 36.

Incorporated in pump delivery conduit 22 is a suitable relief valve 38 which preferably is constructed in accordance with the patent to Vickers, No. 2,043,453. Valve 38 may be vented to unload pump 10 in order to stop motor 32, or said vent may be closed in order to start and operate motor 32. A manually-operated, two-way control valve 40 is connected to a venting port 42 of valve 38 by means of a conduit 44 and connected to tank 14 by means of a conduit 46 for this purpose.

Also incorporated in pump delivery conduit 22 is a flow-control valve 48 which preferably is constructed in accordance with the patent to Vickers, No. 2,272,684. The manner of operation and purpose of valve 48 is well-known in the prior art. Valve 48 will regulate the amount of fluid flowing to motor 32 from pump 10 so as to regulate the speed of a piston 50 reciprocably mounted therein and to which is connected a piston rod 52. The excess volume of fluid delivered by pump 10 will be exhausted to tank 14 through relief valve 38 by means of an exhaust conduit 54 which connects valve 38 to tank 14. Relief valve 38 will also limit the amount of pressure in conduit 22 by exhausting excessive fluid under pressure to tank 14 by means of conduit 54.

Control panel 20 is comprised of a body 56 in which is rotatably mounted within a transverse bore 58 thereof a pilot valve 60 and a reversing valve 62 reciprocably mounted within a longitudinal bore 64. Reversing valve 62 is comprised of a spool 66 having a central land 68 containing a groove 70, a land 72 at the extreme right end and a land 74 at the extreme left end. A chamber 76 in bore 64, located between the left end of spool 66 and a plug 78 threaded into the left end of bore 64, is connected to bore 58 by means of a passage 80. A chamber 82 in bore 64 between the right end of spool 66 and a plug 84 threaded into the right end of bore 64 is connected by means of a passage 86 to the opposite side of bore 58 on the same plane as passage 80. A passage 88 which is connected to pressure port 18 by a branch passage 90 centrally intersects bore 64 and continues to a point of intersection with bore 58. Motor port 30 is connected to bore 64 by means of a passage 92, and motor port 28 is connected to bore 64 by means of a passage 94. A pair of vertical passages 96 and 98 are connected to bore 64 by means of branch passages 100 and 102, respectively. Both vertical passages 96 and 98 intersect a longitudinal passage 104 which intersects bore 58 on a different plane than passage 88 and passages 80 and 86.

As is more clearly shown in Figures 2 and 4, pilot valve 60 consists of a piston 106 having an extended portion 108 for the attachment of arms 110 and 112, shown in dotted lines in Figures 1 and 3. Piston 106 has a pair of flats 114 and 116 connected by a drilled passageway 118. Piston 106 also has a longitudinal bore 120 which extends to a point just short of contact with flats 114 and 116. Duplicate tank ports 122 and 124 are in communication with bore 120 by means of passages 126 and 128, respectively. Piston 106 also has cylinder ports 130 and 132 in communication with bore 120. Piston 106 is rotatably mounted in bore 58 so that the flat 114 will be in continuous communication with pressure passage 88, tank ports 122 and 124 will alternately be in communication with passages 80 and 86, and, because of a groove 134 in piston 106 in line with cylinder ports 130 and 132, cylinder ports 130 and 132 will continuously be in communication with passage 104. A small drilled passageway 136 connects bore 120 with the extended portion 108 of piston 106 to provide a means of lubrication.

Pilot valve 60 is adapted to be operated by dogs, not shown, mechanically attached to motor 32 by contact of said dogs with either arm 110 or 112 at the end of each motor stroke, in the well-known manner. Due to the fact that tank port 24 is formed at one extremity of bore 58 and the pressure port 18 and motor ports 28 and 30 are also brought out to a single flat surface, panel 20 may be flange-mounted against a block 138 containing all circuit connections, as shown in Figure 4. Block 138 contains a pressure connection 140 and a tank connection 142 adapted to register with pressure port 18 and tank port 24, respectively, with suitable sealing rings 144 being provided to prevent leakage between said connections. Motor connections are also provided in the block, one of which is shown in dotted lines and indicated by the numeral 146, which are adapted to register with panel motor ports 28 and 30. As shown in Figures 1 and 3, suitable holes 150 are provided in the body 56 for bolting panel 20 to block 138.

Referring now to Figure 1, in operation with electric motor 12 operating pump 10 and with control valve 40 shifted to close the venting port 42 of valve 38, fluid under pressure from pump 10 will be delivered by means of conduit 22 to the pressure port 18 of panel 20. As shown in Figure 1, pilot valve 60 has been rotated in a counter-clockwise direction when piston 50 of motor 32 completed a leftward movement so as to shift reversing valve 62.

Fluid under pressure entering pressure port 18 enters pressure passage 88 by means of branch passage 90 and is delivered by means of reversing valve 62, flat 114, passage 118 and flat 116 to passage 80, entering chamber 76 to act against land 74 of reversing valve 62, shifting the same rightwardly. Fluid expelled from chamber 82 of reversing valve 62 may flow to tank 14 by means of passage 86, tank port 122, passage 126, bore 120, tank port 24 and conduit 26. With reversing valve 62 shifted completely to the right, pressure fluid from pump 10 in passageway 88 is prevented from entering conduit 36 by means of land 68 and is directed to conduit 34 by means of bore 64, passage 94, and motor port 28 to the left end of motor 32 so as to shift piston 50 thereof rightwardly. Discharging fluid from the right end of motor 32 enters conduit 36, port 30, passage 92, bore 64, passages 102, 98 and 104, and is conducted to tank 14 by means of groove 134 of piston 106, cylinder ports 130 and 132, bore 120, tank port 24 and conduit 26.

When piston 50 of motor 32 has almost completed its rightward stroke, arm 110 of pilot valve 60 will be contacted to shift pilot valve 60 clockwise as is shown in Figure 3. Fluid under pressure from pump 10 is now delivered by means of conduit 22, pressure port 18, branch passage 90 and pressure passage 88 to flat 114 where it is delivered to flat 116 by means of drilled passageway 118. When pilot valve 60 has rotated completely, the flat 116 is no longer in communication with passage 80 but is now in communication with passage 86 so as to direct pressure fluid from pump 10 to chamber 82 and cause reversing valve 62 to shift to the left. Discharging fluid from chamber 76 at the left end of reversing valve 62 may flow to tank 14 by means of passage 80, tank port 124 of piston 106, passage 128, bore 120, tank port 24 and conduit 26. Groove 70 in center land 68 of spool 66, prevents reversing valve 62 from hanging up during its cross-over at center position by permitting a continuous flow of fluid in passage 88 from port 18 to flat 114.

When spool 66 of reversing valve 62 has shifted completely to the left, land 68 will prevent pressure fluid in passage 88 being delivered by pump 10 from entering conduit 34 and direct the same to conduit 36 by means of passage 92 and motor port 30 from where it may enter the right end of motor 32 to shift piston 50 thereof to the left. Discharging fluid from the left end of motor 32 enters conduit 34, port 28 and passage 94, and is directed by land 68 and land 74 to passage 100 from where it is delivered by means of passages 96 and 104 to groove 134 of piston 106. Discharging fluid entering groove 134 is then directed by means of cylinder ports 130 and 132 to bore 120 where it flows to tank 14 by means of tank port 24 and conduit 26. When piston 50 has almost completed its leftward stroke, arm 112 will be contacted so as to again shift pilot valve 60 to the position shown in Figure 1. This will cause fluid to be again directed to chamber 76 and shift reversing valve 62 rightwardly so as to direct fluid to the left end of motor 32 shifting piston 50 in a rightward direction. This reciprocation of piston 50 will continue until it is desirable to stop motor 32 at which time control valve 40 may be shifted to vent valve 38 to tank 14 by means of conduits 44 and 46, and the full volume of pump 10 will be delivered to tank 14 by means of valve 38 and conduit 54.

Thus, pilot valve 60 is so constructed and is rotatably mounted in transverse bore 58 in such a manner that, when rotated clockwise, communication is established between the flat 116 and passage 86 and between cylinder port 124 and passage 80. When pilot valve 60 is rotated counterclockwise, communication is established between the flat 116 and passage 80 and between cylinder port 122 and passage 86. Clockwise or counterclockwise rotation of pilot valve 60 results in fluid being directed to the right or left ends of reversing valve 62 to operate the same, the latter directing pressure fluid to the motor 32 and from the motor 32 to the pilot valve cylinder ports 130 and 132 which are in communication with tank bore 120 of pilot valve 60.

It should be noted that the speed of operation of spool 66 is unhindered by restrictions of any kind and is entirely dependent upon the total volume of fluid reaching chambers 76 or 82 and acting upon the effective area of lands 74 or 72. Due to this fact and also due to the fact that bore 58 is not only adaptable for mounting pilot valve 60 but, in addition, one extremity of the same is used as a tank port with which bore 120 of piston 106 is in direct communication, the diameters of spool 66 and of piston 106 may be much smaller than ordinary valves of this type. In addition, the double application and employment of bore 58 for mounting pilot valve 60 and as a tank port eliminates the construction of supplementary passages usually necessary in panels of this type. Thus, with the size of reversing valve 62 and pilot valve 60 reduced to an absolute minimum, and the number of passages in the housing reduced to a minimum, the total size and weight of control panel 20 is much less than previously-constructed panels of this type.

It should also be noted that, by constructing the pilot valve 60 with the tank bore 120 connected to the duplicate tank ports 122 and 124 and also to the cylinder ports 130 and 132 and rotatably mounting the same in bore 58 so that tank bore 120 is directly connected to external tank port 24, panel 20 is adaptable to gasket mounting against a flat mounting surface bearing corresponding conduits therein registering with the external ports of panel 20.

While the form of embodiment of the invention as herein disclosed constitutes a preferred form, it is to be understood that other forms might be adopted, all coming within the scope of the claims which follow.

What is claimed is as follows:

1. A unitary control panel for use in a hydraulic transmission containing a fluid pump and reversible fluid motor adaptable for mounting against an adjoining block having corresponding circuit connections, said panel comprising a valve block, a pilot valve spool rotatably mounted within a bore of said block, external pressure motor and tank ports, said tank port being formed as an integral part of and at one extremity of said bore, said pilot valve spool having a pair of pressure flats, a passage connecting said flats, means forming a cavity in said spool, and duplicate tank ports and a plurality of motor ports in communication with said cavity, said spool being mounted in said bore so that said cavity is in direct alignment and communication with said external tank port, a fluid pressure operated reversing valve reciprocably mounted in said valve block controlled by said pilot valve, said reversing valve including motor ports connected to said pilot valve motor ports, a pressure passage connected to the external pressure port, to the reversing valve and to one of the pilot valve flats, and means for rotating the pilot valve at each end of a motor stroke whereby a pressure flat is connected to one end of the reversing valve, a pilot valve tank port to the opposite end thereof and a reversing valve motor port through which fluid is adapted to flow from the motor to the pilot valve motor ports.

2. A unitary control panel for use in a hydraulic transmission containing a fluid pump and reversible fluid motor adaptable for mounting against an adjoining block having corresponding circuit connections, said panel comprising a valve block, a pilot valve spool rotatably mounted within a bore of said block, external pressure motor and tank ports, said tank port being formed as an integral part of and at one extremity of said bore, said pilot valve spool having a pair of pressure flats, a passage connecting said flats, means forming a cavity in said spool, and duplicate tank ports and a plurality of motor ports in communication with said cavity, said spool being mounted in said bore so that said cavity is in direct alignment and communication with said external tank port, a fluid pressure operated reversing valve reciprocably mounted by said valve block controlled by said pilot valve, said reversing valve including motor ports connected to said pilot valve motor ports, a pressure passage connected to the external pressure port, to the reversing valve and to one of the pilot valve flats, means for rotating the pilot valve at each end of a motor stroke whereby a pressure flat is connected to one end of the reversing valve, a pilot valve tank port to the opposite end thereof and a reversing valve motor port through which fluid is adapted to flow from the motor to the pilot valve motor ports, and means for mounting said panel against an adjoining block containing corresponding circuit connections so that the external tank port is in direct alignment and communication with the adjoining tank port of said block.

3. In a hydraulic transmission the combination of a fluid pump, a reversible fluid motor and a unitary control panel for producing alternate reversing cycles of said motor, said panel comprising a valve block, a pilot valve rotatably mounted within a bore thereof, a fluid pressure operated reversing valve controlled by said pilot valve reciprocably mounted within said panel, said reversing valve including motor ports, external pressure tank and motor ports, said tank port being formed as an integral part of and located at one extremity of said pilot valve mounting bore, said pilot valve comprising a spool, means forming a cavity within said spool, tank ports in communication with said cavity, motor ports also in communication with said cavity, a pair of pressure flats, and a passage connecting said flats, said spool being mounted within said bore so that said cavity is in alignment and communication with said external tank port, a passage connected to said external pressure port, to the reversing valve, to one of the pilot valve flats and to a source of pressure in the system, and means for rotating said pilot valve at each end of a motor stroke whereby a pressure flat is connected to one end of the reversing valve, a pilot valve tank port is connected to the opposite end thereof and the reversing valve motor port through which fluid is returning from the motor is connected to the pilot valve motor ports.

4. In a hydraulic transmission the combination of a fluid pump, a reversible fluid motor and a unitary control panel for producing alternate reversing cycles of said motor, said panel comprising a valve block, a pilot valve rotatably mounted within a bore thereof, a fluid pressure operated reversing valve controlled by said pilot valve reciprocably mounted within said panel, said reversing valve including motor ports, external pressure tank and motor ports, said tank port being formed as an integral part of and located at one extremity of said pilot valve mounting bore, said pilot valve comprising a spool, means forming a cavity within said spool, tank ports in communication with said cavity, motor ports also in communication with said cavity, a pair of pressure flats, and a passage connecting said flats, said spool being mounted within said bore so that said cavity is in alignment and communication with said external tank port, a passage connected to said external pressure port, to the reversing valve, to one of the pilot valve flats and to a source of pressure in the system, means for rotating said pilot valve at each end of a motor stroke whereby a pressure flat is connected to one end of the reversing valve, a pilot valve tank port is connected to the opposite end thereof and the reversing valve motor port through which fluid is returning from the motor is connected to the pilot valve motor ports, and means for mounting said panel against an adjoining block containing corresponding circuit connections in such a manner that the external tank port of said panel is in alignment and communication with the corresponding connection of said adjoining block.

ROBERT A. ERSKINE.

REFERENCES CITED

The following references are of record in the file of this patent:

UNITED STATES PATENTS

| Number | Name | Date |
| --- | --- | --- |
| 2,192,839 | Orcutt | Mar. 5, 1940 |
| 2,223,038 | Jackson | Nov. 26, 1940 |
| 2,299,851 | Schafer et al. | Oct. 27, 1942 |
| 2,318,855 | Hayden | May 11, 1943 |